US007000986B2

(12) United States Patent
Cruz Fernandes de Pinho et al.

(10) Patent No.: US 7,000,986 B2
(45) Date of Patent: Feb. 21, 2006

(54) LUMBAR SUPPORT APPARATUS

(75) Inventors: Antonio Cruz Fernandes de Pinho, Maia (PT); Miguel Moutinho de Faria, Senhora da Hora (PT)

(73) Assignee: Ficosa North America, Madison Heights, MI (US)

( * ) Notice: Subject to any disclaimer, the term of this patent is extended or adjusted under 35 U.S.C. 154(b) by 140 days.

(21) Appl. No.: 10/251,406

(22) Filed: Sep. 20, 2002

(65) Prior Publication Data

US 2003/0071501 A1 Apr. 17, 2003

Related U.S. Application Data

(60) Provisional application No. 60/325,659, filed on Sep. 28, 2001.

(51) Int. Cl.
*A74C 3/025* (2006.01)
*A47C 7/46* (2006.01)

(52) U.S. Cl. ............................. 297/284.4; 297/284.1; 297/284.7

(58) Field of Classification Search ............. 297/284.4, 297/284.7
See application file for complete search history.

(56) References Cited

U.S. PATENT DOCUMENTS

| | | | |
|---|---|---|---|
| 1,382,344 A | 6/1921 | Coopersmith | |
| 1,872,715 A | 8/1932 | Ferguson | |
| 3,393,941 A | 7/1968 | Grosfillex | |
| 3,724,144 A | 4/1973 | Schuster | |
| 4,156,544 A | 5/1979 | Swenson et al. | |
| 4,316,631 A | 2/1982 | Lenz et al. | |
| 4,354,709 A | 10/1982 | Schuster | |
| 4,396,225 A | 8/1983 | Crosby | |
| 4,452,485 A | 6/1984 | Schuster | |

(Continued)

FOREIGN PATENT DOCUMENTS

| | | |
|---|---|---|
| EP | 0518830 | 12/1992 |
| EP | 0540481 | 5/1993 |
| EP | 0582821 | 2/1994 |
| GB | 2013487 | 8/1979 |
| WO | 9965730 | 12/1999 |

*Primary Examiner*—Rodney B. White
(74) *Attorney, Agent, or Firm*—Jones Day

(57) ABSTRACT

A lumbar support apparatus includes a guide rail on a seat frame, and a bendable occupant support structure mounted for sliding movement on the guide rail. The bendable structure, which is preferably configured as a grid, includes a spring that imparts increasingly bowed contours to the grid upon increasingly arched deflection of the spring relative to the seat frame and the guide rail. The apparatus further includes an actuator, a cable, and a fastener. A first section of the cable extends from the actuator into engagement with the grid so as to apply a bending force to the grid under the influence of the actuator. A second section of the cable extends from the first section to an end portion of the cable that is anchored to the seat frame.

31 Claims, 6 Drawing Sheets

U.S. PATENT DOCUMENTS

| | | | | |
|---|---|---|---|---|
| 4,627,661 A | | 12/1986 | Rönnhult et al. | |
| 4,632,454 A | | 12/1986 | Naert | |
| 4,880,271 A | | 11/1989 | Graves | |
| 4,909,568 A | | 3/1990 | Dal Monte | |
| 4,968,093 A | | 11/1990 | Dal Monte | |
| 5,026,116 A | | 6/1991 | Dal Monte | |
| 5,050,930 A | | 9/1991 | Schuster et al. | |
| 5,108,149 A | | 4/1992 | Ambasz | |
| 5,131,785 A | | 7/1992 | Shimazaki | |
| 5,142,944 A | | 9/1992 | McArthur et al. | |
| 5,197,780 A | | 3/1993 | Coughlin | |
| 5,217,278 A | | 6/1993 | Harrison et al. | |
| 5,397,164 A | | 3/1995 | Schuster et al. | |
| 5,449,219 A | | 9/1995 | Hay et al. | |
| 5,474,358 A | | 12/1995 | Maeyaert | |
| 5,651,584 A | | 7/1997 | Chenot et al. | |
| 5,664,841 A | * | 9/1997 | Dal Monte | 297/284.4 X |
| 5,769,490 A | | 6/1998 | Falzon | |
| 5,775,773 A | * | 7/1998 | Schuster et al. | 297/284.1 |
| 5,788,328 A | | 8/1998 | Lance | |
| 5,816,653 A | * | 10/1998 | Benson | 297/284.4 |
| 5,823,620 A | | 10/1998 | Le Caz | |
| 5,911,477 A | | 6/1999 | Mundell et al. | |
| 5,984,407 A | * | 11/1999 | Ligon et al. | 297/284.4 |
| 6,003,941 A | | 12/1999 | Schuster, Sr. et al. | 297/284.4 X |
| 6,007,151 A | * | 12/1999 | Benson | 297/284.4 |
| 6,036,265 A | * | 3/2000 | Cosentino | 297/284.4 |
| 6,045,185 A | | 4/2000 | Ligon, Sr. et al. | 297/284.4 |
| 6,053,064 A | | 4/2000 | Gowing et al. | |
| 6,079,783 A | * | 6/2000 | Schuster et al. | 297/284.4 |
| 6,079,785 A | | 6/2000 | Peterson et al. | |
| 6,152,531 A | * | 11/2000 | Deceuninck | 297/284.4 |
| 6,152,532 A | * | 11/2000 | Cosentino | 297/284.4 |
| 6,227,618 B1 | * | 5/2001 | Ligon et al. | 297/284.4 |
| 6,254,187 B1 | * | 7/2001 | Schuster et al. | 297/284.1 |
| 6,334,651 B1 | * | 1/2002 | Duan et al. | 297/284.4 |
| 6,338,530 B1 | * | 1/2002 | Gowing | 297/284.4 |
| 6,357,826 B1 | | 3/2002 | Gabas et al. | 297/284.4 |
| 6,430,801 B1 | * | 8/2002 | Cosentino | 29/457 |
| 6,536,840 B1 | * | 3/2003 | Schuster et al. | 297/284.1 |
| 6,652,028 B1 | * | 11/2003 | McMillen | 297/284.4 |
| 6,676,214 B1 | * | 1/2004 | McMillen et al. | 297/284.4 X |
| 6,692,074 B1 | * | 2/2004 | Kopetzky et al. | 297/284.4 X |
| 2003/0085599 A1 | * | 5/2003 | McMillen | 297/284.4 |

\* cited by examiner

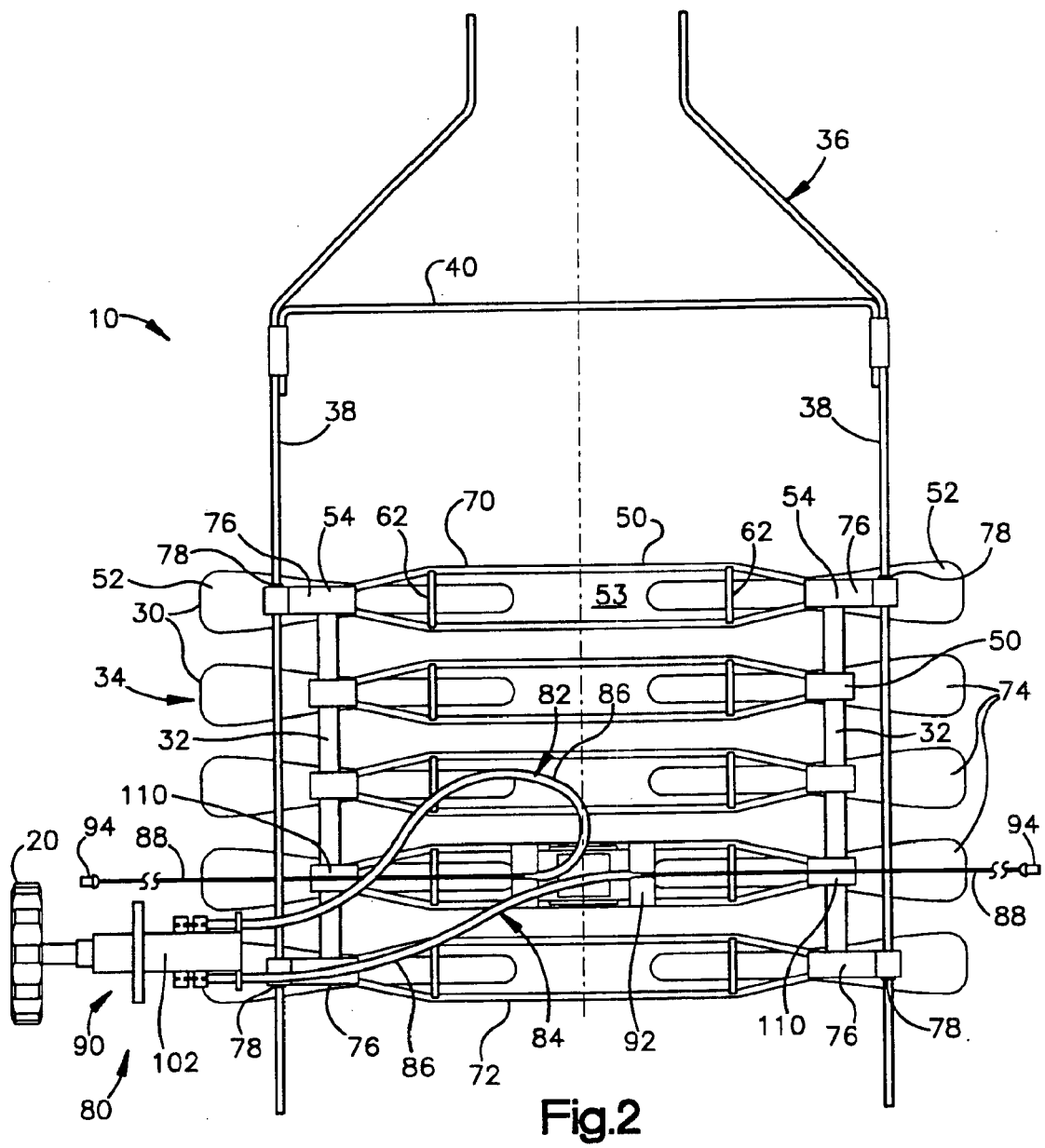
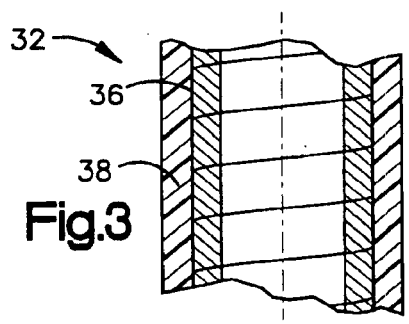
Fig.2
Fig.3

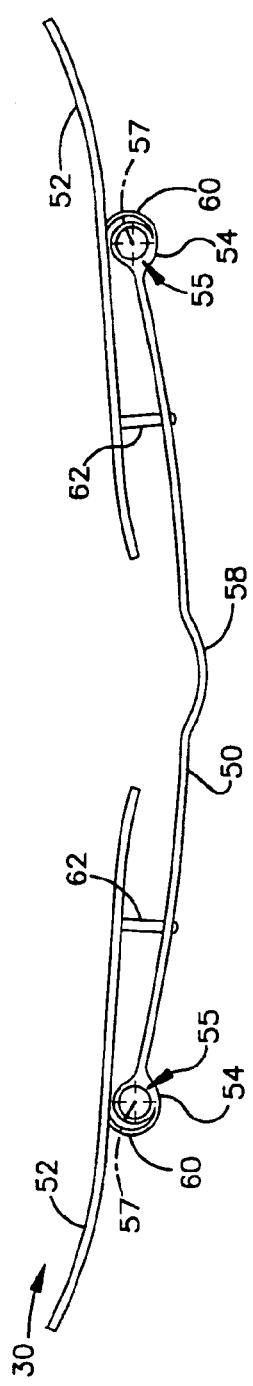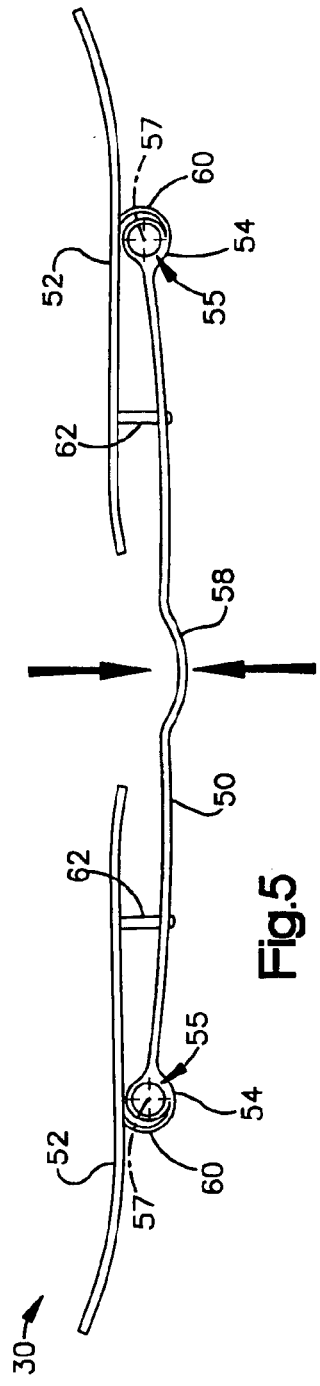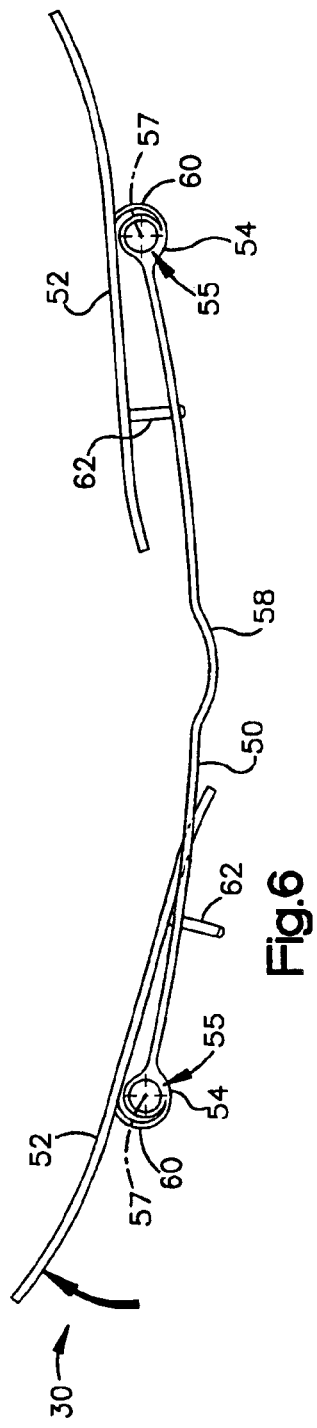

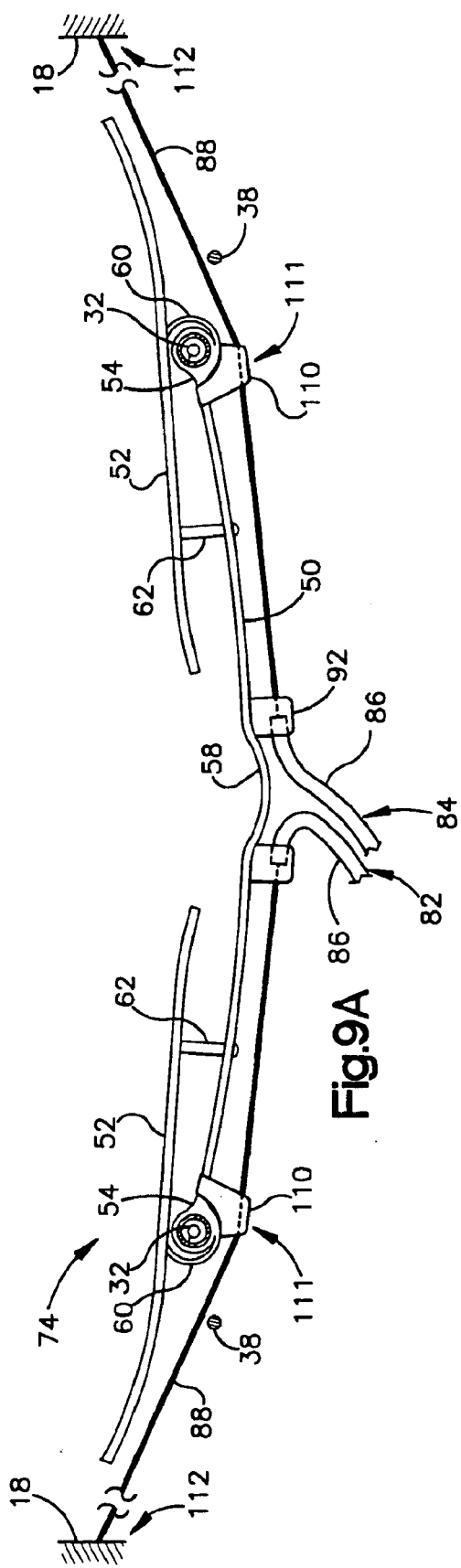
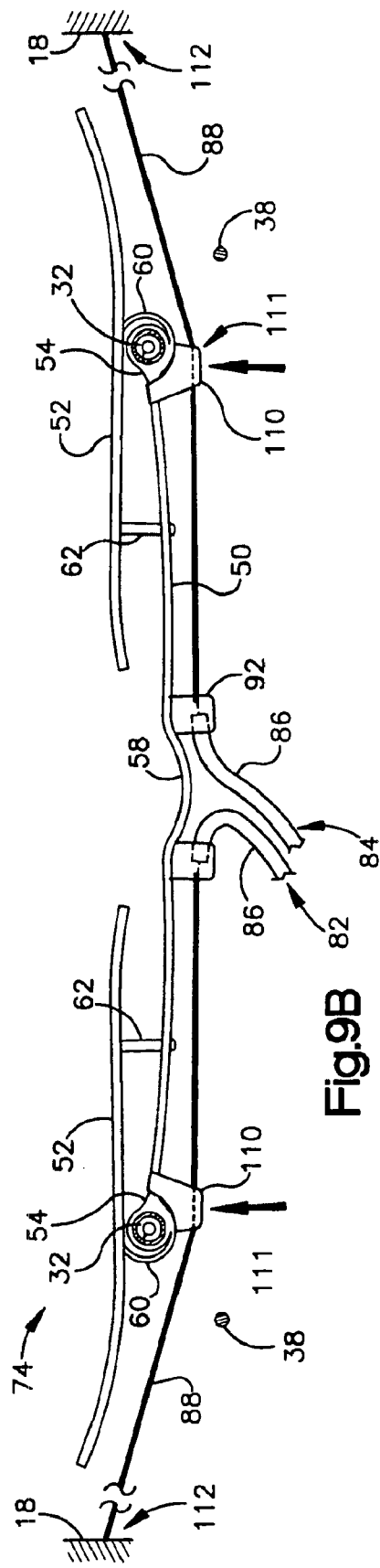

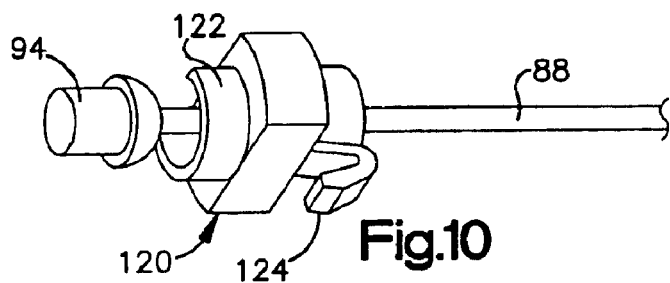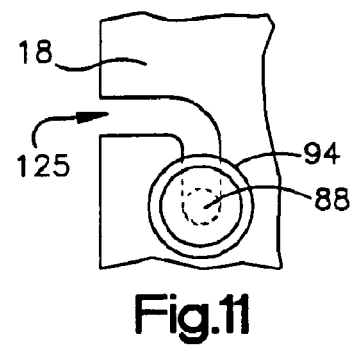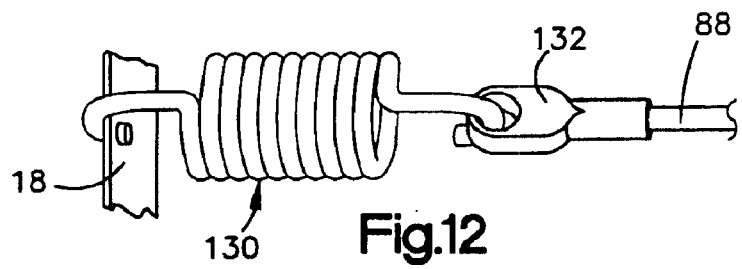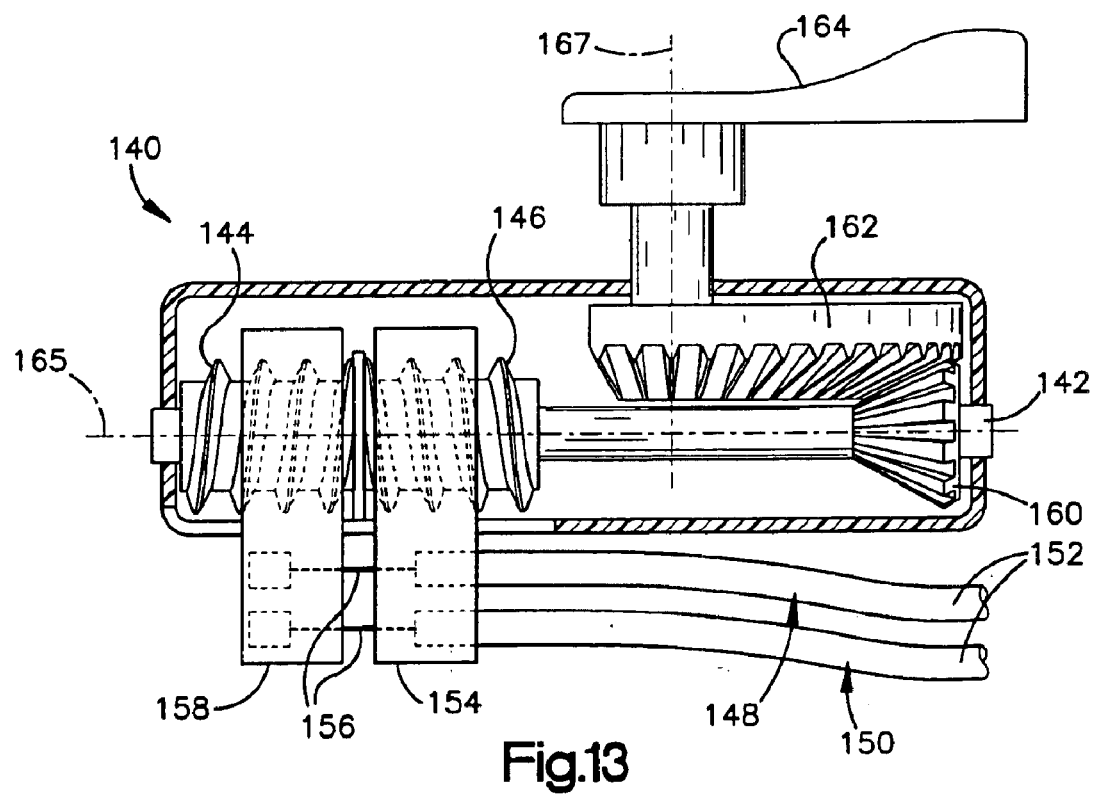

LUMBAR SUPPORT APPARATUS

RELATED APPLICATIONS

This patent application claims priority of U.S. Provisional Patent Application Ser. No. 60/325,659, filed Sep. 28, 2001, which is incorporated by reference.

FIELD OF THE INVENTION

The invention relates to devices that provide lumbar support for occupants of vehicle seats.

BACKGROUND OF THE INVENTION

A vehicle seat may be equipped with a lumbar support system. Such a system operates between the seat frame and the seat cushion at the back of the seat. Differing amounts of lumbar support can be selected by the occupant. If the occupant selects greater lumbar support, the system responds by pressing forward against the lumbar region of the cushion. If the occupant selects less lumbar support, the system responds by retracting from the lumbar region of the cushion.

SUMMARY OF THE INVENTION

The invention includes a guide rail structure configured for mounting on a seat frame. A bendable occupant support structure is mounted for sliding movement on the guide rail structure. The bendable structure includes a spring that imparts increasingly bowed contours to the bendable structure upon increasingly arched deflection of the spring relative to the seat frame and the guide rail structure.

The invention further includes an actuator, a cable, and a fastener. A first section of the cable extends from the actuator into engagement with the bendable structure so as to apply a bending force under the influence of the actuator. A second section of the cable extends from the first section to an end portion of the cable that is spaced from the bendable structure. The fastener is configured to fasten the end portion of the cable to the seat frame.

In accordance with a distinct feature of the invention, the cable extends from the actuator into engagement with an intermediate portion of the bendable structure so as to draw the intermediate portion forward relative to the seat frame and the guide rail structure under the influence of the actuator. This enables the bendable structure to bend and slide into increasingly bowed contours under a bending force applied directly to the intermediate portion.

Another distinct feature of the invention is the spring in the bendable structure. The spring is a coil spring within a plastic sheath, and is preferably formed of a closed coil of metal wire with a rectangular cross section.

The actuator also may comprise a distinct feature of the invention. The actuator may thus include a shaft with a pair of screw-threaded portions that are oriented oppositely relative to each other. A pair of nuts on the screw-threaded portions of the shaft are movable axially toward and away from each other upon rotation of the shaft about its longitudinal axis. One of the nuts on the actuator is configured for attachment to the sheath portions of a pair of Bowden cables. The other nut on the actuator is configured for attachment to the cable portions of the Bowden cables. The actuator further includes a lever which is pivotal about another axis. Bevel gears interconnect the shaft with the lever such that a first amount of pivotal movement of the lever will impart a second, greater amount of rotation to the shaft.

BRIEF DESCRIPTION OF THE DRAWINGS

FIG. 2 is a rear view of the lumbar support system of FIG. 1;

FIG. 3 is a partial sectional view of a part shown in FIG. 1;

FIG. 4 is a top view of another part shown in FIG. 1;

FIGS. 5 and 6 are views similar to FIG. 4, showing the part in differently deflected conditions;

FIG. 9A is a top view of parts shown in FIG. 1;

FIG. 9B is a view similar to view FIG. 9A, showing parts in different positions;

FIG. 10 is an enlarged view of parts of the apparatus of FIG. 1;

FIG. 11 is a view of alternative parts for the apparatus of FIG. 1;

FIG. 12 is another view of alternative parts for the apparatus of FIG. 1; and

FIG. 13 is yet another view of alternative parts for the apparatus of FIG. 1.

DESCRIPTION

Figure 1:
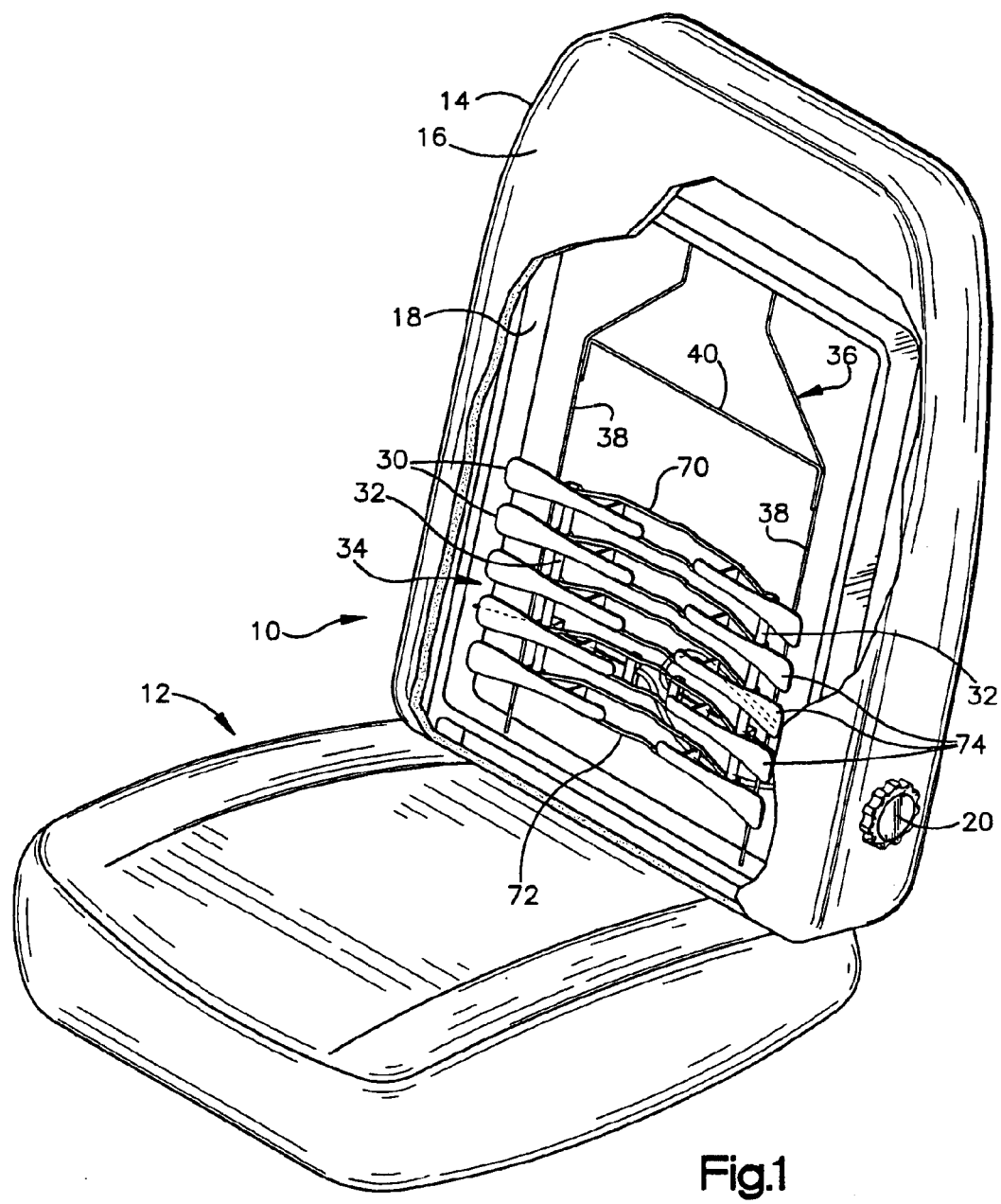
FIG. 1 is a perspective view of a vehicle seat equipped with a lumbar support system.

The apparatus 10 shown in FIG. 1 has parts which, as described below, are examples of the elements recited in the claims. This apparatus 10 is a lumbar support system for an occupant of a vehicle seat 12. The seat 12 has a back portion 14 with a cushion 16 mounted on a frame 18. The lumbar support system 10 also is mounted on the frame 18, and operates between the frame 18 and the cushion 16 to provide the seated occupant with lumbar support under the influence of an actuator knob 20 at the side of the seat 12.

The lumbar support system 10 includes ribs 30 and spring bars 32 which together define a bendable occupant support structure in the form of a grid 34. A guide rail structure 36 mounts the grid 34 on the frame 18. The guide rail structure 36 is formed of metal rods, including a pair of vertical rods 38 which extend into the frame 18 at their upper and lower ends, and a horizontal rod 40 which reinforces the vertical rods 38.

As shown in FIGS. 1 and 2, the spring bars 32 are spaced horizontally from the vertical rods 38, and are arranged as vertical cross bars that interconnect the ribs 32 in the grid 34. As shown for example in FIG. 3, each spring bar 32 includes a coil spring 36 in a plastic sheath 38. Each coil spring 36 is formed of a closed coil of metal wire with a rectangular cross section.

The ribs 32 are flexible plastic structures. As viewed from above in FIG. 4, each rib 30 has a back portion 50 and a pair of front portions 52. The back portion 50 is shaped as a horizontally elongated loop defining a slot-shaped opening 53 (FIG. 2). A pair of cylindrical sleeves 54 are located at the opposite ends of the back portion 50. Each sleeve 54 defines a cylindrical bore 55 which is centered on a vertical axis 57. The spring bars 32 (FIG. 2) are received tightly through the bores 55 in the sleeves 54.

As further shown in FIG. 4, the back portion 50 of the rib 30 projects rearwardly from the sleeves 54, and has an arcuate central section 58. The central section 58 acts as a hinge for forward and rearward deflection of the back portion 50 relative to the sleeves 54, as indicated in FIG. 5. This enables the rib 30 to flex back and forth relative to the spring bars 32 extending through the bores 55 in the sleeves 54.

Each rib 30 further has a pair of flexible arms 60 that connect the front portions 52 with the back portion 50. The arms 60 act as hinges that support the front portions 52 for movement pivotally about the sleeves 54, as indicated on the left in FIG. 6. Tabs 62 project rearwardly from the front portions 52 through the opening 53 in the back portion 50. The tabs 62 are configured as stop members for limiting return pivotal movement of the front portions 50, as indicated on the right in FIG. 6.

The spring bars 32 support the ribs 30 in the horizontally extending, vertically spaced-apart positions in which they are shown in FIGS. 1 and 2. Accordingly, the ribs 30 include an upper rib 70 at the upper end of the grid 34, a lower rib 72 at the lower end of the grid 34, and intermediate ribs 74 in-between.

As shown in the rear view of FIG. 2, the upper and lower ribs 70 and 72 have mounting arms 76 projecting rearwardly from their sleeves 54 to the adjacent vertical rods 38 in the guide rail structure 36. The mounting arms 76 engage the rods 38 to support the upper and lower ribs 70 and 72 for sliding movement along the rods 38. A pair of rings 78 are fixed to the rods 38 above the arms 76 on the upper rib 70. These rings 78 limit upward movement of the upper rib 70. Another pair of rings 78 are fixed to the rods 38 beneath the arms 76 on the lower rib 72. Those rings 78 limit downward movement of the lower rib 72. The upper and lower ribs 70 and 72 are thus supported on the rails 38 for sliding movement vertically toward each other from the positions in which they are shown in Fig. in 2, and for sliding movement vertically away from each other back toward those positions.

Figure 7A:
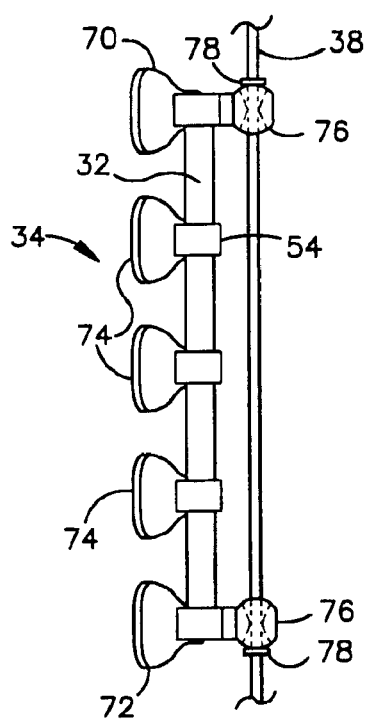
FIGS. 7A and 7B are schematic side views showing other parts in differently deflected conditions.
Figure 7B:
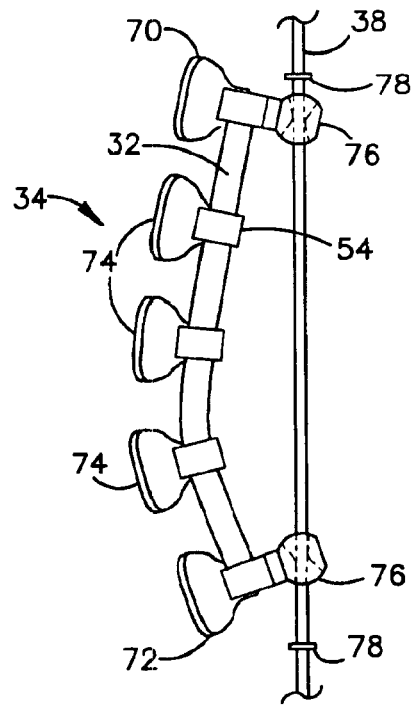

The intermediate ribs 74 can move forward relative to the vertical rods 38, as shown in FIGS. 7A and 7B. If the intermediate ribs 74 are moved forward in this manner, they will force the spring bars 32 to bend into forwardly arched conditions. The spring bars 32, in turn, will move the upper and lower ribs 70 and 72 toward each other along the vertical rods 38, and the entire grid 34 will deflect into a correspondingly bowed contour. The knob 20 at the side of the seat 12 is part of an actuator assembly 80 which shifts the grid 34 into and out of such bowed contours.

Figure 8:
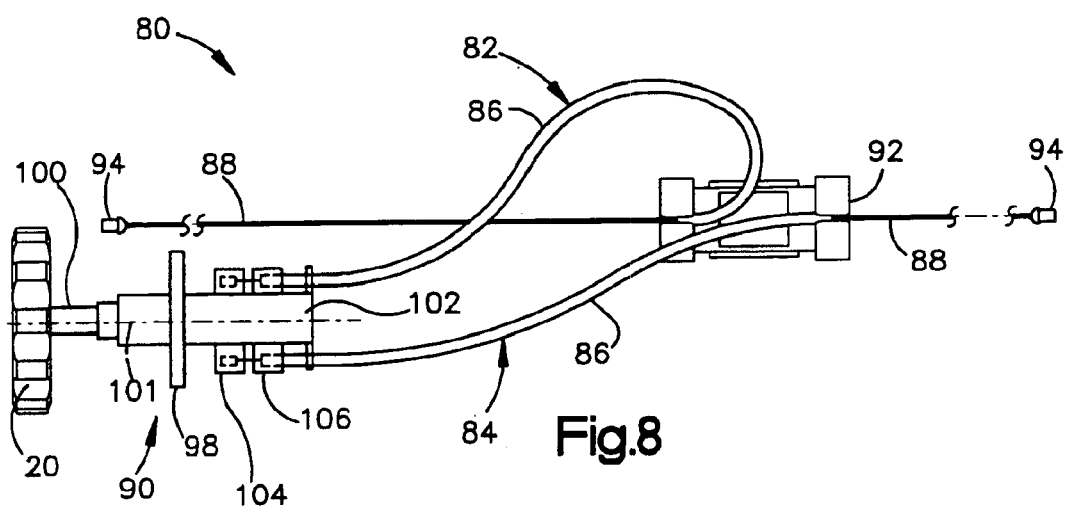
FIG. 8 is a separate view of parts shown in FIG. 2.

As shown separately in FIG. 8, the actuator assembly 80 includes a pair of Bowden cables 82 and 84. Each of the Bowden cables 82 and 84 includes a plastic sheath 86 and a metal cable 88 which extends through, and projects outward from, the corresponding sheath 86. Other parts of the actuator assembly 80 include an actuator 90 and a clip 92. The sheaths 86 extend from the actuator 90 to the clip 92, and are fixed to the clip 92. The cables 88 extend beyond the clip 92, and have anchors 94 and their outer ends.

The actuator 90 has a mounting flange 98 for mounting to the seat frame 18 (FIG. 1). The actuator 90 further has a shaft 100 with a longitudinal central axis 101. The shaft 100 projects from a housing 102, and is rotatable relative to the housing 102 in opposite directions about the axis 101. An inner portion (not shown) of the shaft 100 has first and second screw threads that are oriented oppositely relative to each other. A first nut 104 on the housing 102 is engaged with the first screw thread. A second nut 106 on the housing 102 is engaged with the second screw thread. The nuts 104 and 106 can slide along the length of the housing 102, but are blocked from rotating about the housing 102. Accordingly, when the shaft 100 is rotated in one direction, the nuts 104 and 106 are moved axially away from each other. When the shaft 100 is rotated in the opposite direction, the nuts 104 and 106 are moved axially back toward each other.

The cables 88 are fixed to the first nut 104 on the actuator housing 102. The sheaths 86 are fixed to the second nut 106. Therefore, rotation of the shaft 100 in one direction draws the cables 88 inward of the sheaths 86, and thus decreases the lengths of the cables 88 between the anchors 94 and the clip 92. Opposite rotation of the shaft 100 pushes the cables 88 back outward of the sheaths 86, and thus increases the lengths of the cables 88 between the anchor 94 and the clip 92.

The actuator assembly 80 is connected directly with one of the intermediate ribs 74 in the grid 34. Specifically, as best shown in FIG. 9A, the clip 92 is mounted on the central section 58 of an intermediate rib 74. This particular rib 74 has a pair of cable support members 110 projecting rearwardly from the sleeves 54 near its opposite ends. The cables 88 are received in open grooves 111 at the rear of the cable support members 110, and extend forward to locations 112 at which they are anchored in the seat frame 18, as shown schematically in FIG. 9A.

A pair of fasteners 120, one of which is shown in FIG. 10, fasten the cables 88 to the seat frame 18 at the anchor locations 112. Each cable 88 extends through a passage in the respective fastener 120, and the anchor 94 is received in a pocket portion 122 of the fastener 120. A flexible locking tab 124 on the fastener 120 snaps into interlocked engagement with the frame 18.

FIGS. 9A and 9B illustrate the manner in which the actuator assembly 80 shifts the grid 34 into and out of bowed conditions selected by the seated occupant. For example, the occupant may rotate the knob 20 so as to draw the cables 88 inward of the sheaths 86 at the Bowden cables 82. As viewed from above in FIGS. 9A and 9B, movement of the cables 88 inward of the sheaths 86 decreases the lengths of the cables 88 extending from the clip 92 to the anchor locations 112. As a result, the cables 88 move the intermediate rib 74 forward relative to the vertical rods 38, as indicated by the arrows shown in FIG. 9B. Such forward movement of the intermediate rib 74 causes the grid 34 to bow forward against the forceful resistance of the spring bars 34, as described above with reference to FIG. 7B. The bowed grid 34 provides a greater amount of lumbar support behind the seat cushion 16. The grid 34 will return toward less bowed conditions under corresponding return spring forces when the knob 20 is subsequently rotated in the opposite direction.

Alternative parts can be used in the apparatus 10. As shown for example in FIG. 11, the anchor 94 itself may serve as a fastener for fastening the end of the respective cable 88 to the seat frame 18. In this example, the cable 88 is received in a J-hook slot 125 in the frame 18. As shown in FIG. 12, an alternative fastener 130 in the form of a spring engages an alternative anchor 132 to support a cable 88 on the frame 18. The spring 130 is extendible under vehicle occupant weight loads.

An alternative actuator 140 is shown in FIG. 13. Like the actuator 90, this actuator 140 has a shaft 142 with a pair of oppositely oriented screw threads 144 and 146. A pair of Bowden cables 148 and 150 have their sheaths 152 fixed to a first nut 154 on the shaft 142, and have their cables 156 fixed to a second nut 158 on the shaft 142.

A pair of bevel gears 160 and 162 interconnect the shaft 142 with a lever 164. The bevel gears 160 and 162 rotate the shaft 142 about its longitudinal axis 165 upon movement of the lever 164 pivotally about a perpendicular axis 167. For a given amount of pivotal movement of the lever 164, the bevel gears 160 and 162 will impart a greater amount of rotation to the shaft 142. As compared with rotation of the knob 20 (FIG. 8), pivotal movement of the lever 164 will thus produce a correspondingly greater amount of actuation of the respective Bowden cables 148 and 150.

This written description uses examples to disclose the invention, including the best mode, and also to enable a person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use with a seat frame, said apparatus comprising:
   a guide rail structure configured for mounting on the seat frame;
   a bendable occupant support structure which is mounted for sliding movement on said guide rail structure, said bendable structure including a spring configured to impart increasingly bowed contours to said bendable structure upon increasingly arched deflection of said spring relative to the seat frame and said guide rail structure;
   an actuator;
   a cable having a first section extending from said actuator into engagement with said bendable structure so as to apply a bending force to said bendable structure under the influence of said actuator, and further having a second section extending from said first section to an end portion of said cable that is spaced from said bendable structure; and
   a fastener configured to fasten said end portion of said cable to the seat frame, whereby said cable can transmit and apply a reaction force from the seat frame as a bending force at said bendable structure.

2. An apparatus as defined in claim 1 wherein said bendable structure has opposite end portions that are movable relatively toward each other, and an intermediate portion that is movable away from said opposite end portions, upon said arched deflection of said spring; and said cable engages said bendable structure at said intermediate portion so as to move said intermediate portion relative to said guide rail structure against a bias of said spring under the influence of said actuator.

3. An apparatus as defined in claim 2 wherein said opposite end portions of said bendable structure are supported on said guide rail structure for sliding movement relative to each other along said guide rail structure, and said intermediate portion is spaced from said guide rail structure.

4. An apparatus as defined in claim 2 wherein said bendable structure includes horizontally extending ribs and said spring is part of a vertically elongated spring structure which interconnects said ribs.

5. An apparatus as defined in claim 1 wherein said cable is a Bowden cable.

6. An apparatus as defined in claim 1 wherein said fastener includes a spring which is extendible between the seat frame and said end portion of said cable.

7. An apparatus for use with a seat frame, said apparatus comprising:
   a guide rail structure configured for mounting on the seat frame;
   a bendable occupant support structure which is mounted for sliding movement on said guide rail structure such that opposite end portions of said bendable structure are movable relatively toward each other, and an intermediate portion of said bendable structure is movable away from said opposite end portions, upon bending of said bendable structure into increasingly bowed contours arched forward relative to the seat frame and said guide rail structure;
   an actuator; and
   a cable extending from said actuator into engagement with said bendable structure at said intermediate portion so as to move said intermediate portion forward relative to the seat frame and said guide rail structure under the influence of said actuator, whereby said bendable structure can bend and slide on said guide rail structure into said increasingly bowed contours under a bending force applied directly to said intermediate portion.

8. An apparatus as defined in claim 7 wherein said opposite end portions of said bendable structure are supported on said guide rail structure for sliding movement relative to each other along said guide rail structure, and said intermediate portion is spaced from said guide rail structure.

9. An apparatus as defined in claim 7 wherein said bendable structure includes a spring structure configured to impart said bowed contours to said bendable structure upon arching deflection of said spring structure relative to said guide rail structure, and said spring structure interconnects said portions of said bendable structure for movement together relative to said guide rail structure upon said arching deflection of said spring structure.

10. An apparatus as defined in claim 7 wherein said bendable structure includes horizontally extending ribs and a vertically extending spring structure interconnecting said ribs.

11. An apparatus as defined in claim 7 wherein said cable is a Bowden cable.

12. An apparatus as defined in claim 7 wherein said cable has a first section extending from said actuator to said intermediate portion of said bendable structure, and further has a second section extending from said first section to an end portion of said cable that is spaced from said bendable structure; and further comprising a fastener configured to fasten said end portion of said cable to the seat frame.

13. An apparatus as defined in claim 20 wherein said fastener includes a spring which is extendible between the seat frame and said end portion of said cable structure.

14. An apparatus for use with a seat frame, said apparatus comprising:
   a lumbar support structure which is bendable relative to the seat frame, said bendable structure including a spring configured to impart increasingly bowed conditions to said bendable structure upon increasingly arched deflection of said spring relative to the seat frame, with said spring comprising a coil spring in a plastic sheath.

15. An apparatus as defined in claim 14 wherein said bendable structure is configured as a grid defined by ribs that are interconnected by said spring.

16. An apparatus for use with a seat frame, said apparatus comprising:
   a guide rail structure configured for mounting on the seat frame;
   a bendable occupant support structure which is mounted for sliding movement on said guide rail structure, said bendable structure including a spring configured to impart increasingly bowed contours to said bendable structure upon increasingly arched deflection of said spring relative to the seat frame and said guide rail structure;

an actuator;

a cable having a first section extending from said actuator into engagement with said bendable structure so as to apply a bending force to said bendable structure under the influence of said actuator, and further having a second section extending from said first section to an end portion of said cable that is spaced from said bendable structure; and a fastener configured to fasten said end portion of said cable to the seat frame, whereby said cable can transmit and apply a reaction force from the seat frame as a bending force at said bendable structure;

wherein said bendable structure has opposite end portions that are movable relatively toward each other, and an intermediate portion that is movable away from said opposite end portions, upon said arched deflection of said spring; and said cable engages said bendable structure at said intermediate portion so as to move said intermediate portion relative to said guide rail structure against a bias of said spring under the influence of said actuator;

wherein said bendable structure includes horizontally extending ribs and said spring is part of a vertically elongated spring structure which interconnects said ribs; and wherein said ribs include an upper rib defining one of said end portions of said bendable structure, a lower rib defining the other of said end portions, and an intermediate rib defining said intermediate portion; and said cable engages said intermediate rib so as to move said intermediate rib against a bias of said spring under the influence of said actuator.

17. An apparatus as defined in claim 16 wherein said guide rail structure includes a pair of vertically extending guide rails upon which said upper and lower ribs are supported for sliding movement relative to each other.

18. An apparatus as defined in claim 17 wherein said intermediate rib extends across said guide rails at locations spaced forward from said guide rails.

19. An apparatus as defined in claim 17 wherein said spring is part of a spring structure comprising a pair of vertically extending spring members spaced horizontally from said guide rails.

20. An apparatus for use with a seat frame, said apparatus comprising:

a guide rail structure configured for mounting on the seat frame;

a bendable occupant support structure which is mounted for sliding movement on said guide rail structure such that opposite end portions of said bendable structure are movable relatively toward each other, and an intermediate portion of said bendable structure is movable away from said opposite end portions, upon bending of said bendable structure into increasingly bowed contours arched forward relative to the seat frame and said guide rail structure;

an actuator;

a cable extending from said actuator into engagement with said bendable structure at said intermediate portion so as to move said intermediate portion forward relative to the seat frame and said guide rail structure under the influence of said actuator, whereby said bendable structure can bend and slide on said guide rail structure into said increasingly bowed contours under a bending force applied directly to said intermediate portion;

wherein said bendable structure includes horizontally extending ribs and a vertically extending spring structure interconnecting said ribs; and wherein said ribs include an upper rib defining one of said end portions of said bendable structure, a lower rib defining the other of said end portions, and an intermediate rib defining said intermediate portion; and said cable engages said intermediate rib so as to move said intermediate rib forward against a bias of said spring structure under the influence of said actuator.

21. An apparatus as defined in claim 20 wherein said guide rail structure includes a pair of vertically extending guide rails upon which said upper and lower ribs are supported for sliding movement relative to each other.

22. An apparatus as defined in claim 21 wherein said intermediate rib extends across said guide rails at locations spaced forward from said guide rails.

23. An apparatus as defined in claim 21 wherein said spring structure comprises a pair of vertically extending spring members spaced horizontally from said guide rails.

24. An apparatus as defined in claim 20 wherein said cable has a first section extending from said actuator to said intermediate rib, and further has a second section extending from said first section to an end portion of said cable that is spaced from said bendable structure; and further comprising a fastener configured to fasten said end portion of said cable to the seat frame.

25. An apparatus for use with a seat frame, said apparatus comprising:

a lumbar support structure which is bendable relative to the seat frame, said bendable structure including a spring configured to impart increasingly bowed conditions to said bendable structure upon increasingly arched deflection of said spring relative to the seat frame, with said spring comprising a coil spring in a plastic sheath;

wherein said coil spring is formed of a closed coil of metal wire with a rectangular cross section.

26. An apparatus for use with a seat frame, said apparatus comprising:

a lumbar support structure which is bendable relative to the seat frame, said bendable structure including a spring configured to impart increasingly bowed conditions to said bendable structure upon increasingly arched deflection of said spring relative to the seat frame, with said spring comprising a coil spring in a plastic sheath;

wherein said bendable structure is configured as a grid defined by ribs that are interconnected by said spring; and said spring is one of a pair of parallel springs perpendicular to said ribs.

27. An apparatus for use with a seat frame, said apparatus comprising:

a guide rail structure configured for mounting on the seat frame;

a bendable occupant support structure having horizontally extending ribs including an upper rib, a lower rib, and an intermediate rib, said bendable structure being mounted for sliding movement on said guide rail structure such that said upper and lower ribs are movable relatively toward each other, and said intermediate rib is movable forward from said upper and lower ribs, upon bending of said bendable structure into increasingly bowed contours arched forward relative to the seat frame and said guide rail structure;

an actuator; and a cable extending from said actuator into engagement with said bendable structure at said intermediate rib so as to move said intermediate rib forward relative to the seat frame and said guide rail structure under the influence of said actuator, whereby said bendable structure can bend and slide on said guide rail structure into said increasingly bowed contours under a bending force applied directly to said intermediate rib.

28. An apparatus as defined in claim 27 wherein said guide rail structure includes a pair of vertically extending guide rails upon which said upper and lower ribs are supported for sliding movement relative to each other.

29. An apparatus as defined in claim 28 wherein said intermediate rib extends across said guide rails at locations spaced forward from said guide rails.

30. An apparatus as defined in claim 28 wherein said spring structure comprises a pair of vertically extending spring members spaced horizontally from said guide rails.

31. An apparatus as defined in claim 27 wherein said cable has a first section extending from said actuator to said intermediate rib, and further has a second section extending from said first section to an end portion of said cable that is spaced from said bendable structure; and further comprising a fastener configured to fasten said end portion of said cable to the seat frame.

* * * * *

UNITED STATES PATENT AND TRADEMARK OFFICE
CERTIFICATE OF CORRECTION

| | |
|---|---|
| PATENT NO. | : 7,000,986 B2 |
| APPLICATION NO. | : 10/251406 |
| DATED | : February 21, 2006 |
| INVENTOR(S) | : Fernandes de Pinho et al. |

It is certified that error appears in the above-identified patent and that said Letters Patent is hereby corrected as shown below:

In column 6, claim 13, first line, delete "20" and insert -- 12 --.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,000,986 B2 | Page 1 of 1 |
| APPLICATION NO. | : 10/251406 | |
| DATED | : February 21, 2006 | |
| INVENTOR(S) | : Fernandes de Pinho et al. | |

It is certified that error appears in the above-identified patent and that said Letters Patent is hereby corrected as shown below:

In column 6, claim 13, first line, delete "20" and insert -- 12 --.

Signed and Sealed this

Twenty-fourth Day of July, 2007

JON W. DUDAS
*Director of the United States Patent and Trademark Office*